(12) United States Patent
Sachdev et al.

(10) Patent No.: US 9,362,551 B2
(45) Date of Patent: Jun. 7, 2016

(54) REINFORCED BATTERY ELECTRODES

(75) Inventors: Anil K. Sachdev, Rochester Hills, MI (US); Mark W. Verbrugge, Troy, MI (US); Xingcheng Xiao, Troy, MI (US); Peter Maxwell Sarosi, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 981 days.

(21) Appl. No.: 13/330,803

(22) Filed: Dec. 20, 2011

(65) Prior Publication Data

US 2013/0157125 A1 Jun. 20, 2013

(51) Int. Cl.
*H01M 4/36* (2006.01)
*H01M 4/38* (2006.01)
*H01M 4/66* (2006.01)
*H01M 4/134* (2010.01)
*H01M 4/62* (2006.01)
*B22F 7/00* (2006.01)
*C22C 9/00* (2006.01)
*C22C 19/03* (2006.01)
*C22C 28/00* (2006.01)
*H01M 4/1395* (2010.01)
*H01M 10/052* (2010.01)
*H01M 4/02* (2006.01)

(52) U.S. Cl.
CPC .............. *H01M 4/134* (2013.01); *B22F 7/004* (2013.01); *C22C 9/00* (2013.01); *C22C 19/03* (2013.01); *C22C 28/00* (2013.01); *H01M 4/626* (2013.01); *H01M 4/667* (2013.01); *B22F 2999/00* (2013.01); *H01M 4/1395* (2013.01); *H01M 4/661* (2013.01); *H01M 10/052* (2013.01); *H01M 2004/021* (2013.01); *Y02E 60/122* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

| | | | | |
|---|---|---|---|---|
| 6,030,726 | A * | 2/2000 | Takeuchi et al. | 429/231.8 |
| 2006/0127773 | A1* | 6/2006 | Kawakami et al. | 429/245 |
| 2008/0248393 | A1* | 10/2008 | Richard | H01M 4/136 429/231.95 |
| 2009/0263717 | A1* | 10/2009 | Ramasubramanian | H01M 4/0452 429/218.1 |

* cited by examiner

*Primary Examiner* — Barbara Gilliam
*Assistant Examiner* — Adam A Arciero
(74) *Attorney, Agent, or Firm* — Reising Ethington P.C.

(57) ABSTRACT

The gravimetric and volumetric efficiency of lithium ion batteries may be increased if high capacity materials like tin and silicon may be employed as the lithium-accepting host in the negative electrode of the battery. But both tin and silicon, when fully charged with lithium, undergo expansions of up to 300% and generate appreciable internal stresses which have potential to spall off material from the electrode on each discharge-charge cycle, resulting in a progressive reduction in battery capacity, also known as battery fade. A method of reinforcing such electrode materials by incorporating within them fiber reinforcements or shaped, elongated reinforcements fabricated of shape memory alloy is described. Electrode materials incorporating such reinforcements are less prone to damage under applied stress and so less prone to battery fade.

18 Claims, 2 Drawing Sheets

US 9,362,551 B2

REINFORCED BATTERY ELECTRODES

TECHNICAL FIELD

This invention pertains to electrode materials and structures for the cells of lithium-ion batteries in which lithium ions are repeatedly inserted into and removed from electrode active material during charging and discharging of the battery. More specifically, this invention pertains to methods and treatments for incorporating in such electrode materials reinforcing features of shape memory alloy to reduce electrode strain and promote enhanced battery life.

BACKGROUND OF THE INVENTION

Secondary or rechargeable lithium-ion batteries may be used as electric energy storage systems for powering electric and hybrid electric vehicles. These batteries comprise a plurality of suitably interconnected electrochemical cells each of which undergoes a specific chemical reaction capable of generating electrical energy. When suitably arranged, these cells provide a predetermined electrical current at a specified electrical potential to an external load, such as an electric motor. Once discharged, such a battery may be re-charged by supplying electrical energy to the battery to reverse the chemical reaction undergone at the electrodes and render the battery again capable of delivering electrical power.

In each cell of a lithium battery, lithium is transported as lithium ions from a negative electrode through a non-aqueous, lithium-containing, electrolyte solution to a lithium ion-accepting positive electrode as an electric current is delivered from the battery to an external load, for example, in a vehicle, an electric traction motor. A suitable porous separator material, infiltrated with the electrolyte solution and permeable to the transport of lithium ions in the electrolyte, is employed to prevent short-circuiting physical contact between the electrodes.

Graphite has been commonly used as a negative electrode material in such batteries and is generally employed as a thin particulate layer bonded to a copper current collector. During charging of the cells, lithium is inserted into the graphite (lithiation), forming $LiC_6$, with a capacity of about 372 mAh/g, and extracted from the graphitic carbon during discharging (de-lithiation).

A suitable particulate material for receiving and storing inserted lithium during discharge of each cell is used as the positive electrode material. Examples of such positive electrode materials include lithium cobalt oxide ($LiCoO_2$), a spinel lithium transition metal oxide such as spinel lithium manganese oxide ($LiMn_xO_y$), a lithium polyanion such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Suitable positive electrode materials are often bonded as a thin layer to an aluminum current collector. The electrochemical potential of such lithium ion cells is typically in the range of about 2 to 4.5 volts.

The use of lithium-ion batteries to power electric motors in automotive vehicles has led to the need for higher gravimetric and/or volumetric capacity batteries. While graphitic carbon is a durable and useful lithium-intercalating, negative electrode material for lithium-ion cells, it has a relatively low capacity (372 mAh/g) for such lithium insertion. Other potential negative electrode materials such as silicon (theoretical capacity, about 3600 mAh/g for $Li_{15}Si_4$) and tin (theoretical capacity, about 990 mAh/g for $Li_{22}Sn_5$) have much higher theoretical capacities than graphite for lithium insertion.

However, unlike graphite, silicon undergoes a volume change of up to 300 volume percent during the course of lithiation and de-lithiation. Tin exhibits similar behavior. Such dramatic volume changes may induce appreciable stresses which may lead to fracture of the active (for example, silicon or tin) material so that a broken-off portion of the active material (for example, silicon or tin) loses electrical contact with the remainder of the electrode. Any portion of the electrode material not in electrical contact with the remainder of the electrode material may not participate in the electrochemical reactions of the battery and so reduces battery capacity on subsequent charge-discharge cycling. Obviously any such factures which result in separation of the electrode from the current collector will likewise reduce battery capacity on charge-discharge cycling, a phenomenon commonly known as battery fade.

Thus there remains a need for a more effective way of utilizing high energy capacity negative electrode materials such as silicon or tin to enable development of a high-capacity, fade resistant lithium ion battery.

SUMMARY OF THE INVENTION

This invention pertains to lithium-ion electrochemical cells that use high capacity negative electrode materials, such as silicon and tin, for absorbing and de-sorbing lithium during repeated cycling of the cell. As stated, such electrode materials typically experience significant volume change as lithium is absorbed or released. In accordance with embodiments of the invention, such negative electrode materials may incorporate elongated, electrode material-engaging, electrically-conducting reinforcements.

The reinforcements may deform in concert with the electrode material to maintain mechanical and electrical continuity across the reinforcement-electrode material interface while limiting the strains experienced by the electrode material during lithiation and de-lithiation. By limiting such strains, fracture of the electrode material is rendered less likely. But even if electrode material fractures do occur, the ability of the elongated reinforcement to bridge any fracture may minimize loss of the fractured, broken-off electrode material pieces. The reinforcement may also maintain electrical continuity across a fracture so that even broken-off portions of an electrode may continue to contribute battery capacity.

The reinforcement, to be effective, should not experience irreversible or permanent deformation, for example plastic flow, under load since any inelastic response will apply a permanent 'set' to the reinforcement. Such a set may prevent it from relaxing to its original unstrained dimension and so render it less capable of restraining electrode material on the next and subsequent cycles. Rather the electrode material and the reinforcement should deform in tandem so that continuity is maintained across the electrode material-reinforcement interface. This requirement, and the large expansions undergone by the unrestrained electrode material calls for a reinforcement which may exhibit reversible strains appreciably greater than the few tenths of a percent elastic strain exhibited by conventional metals and alloys. A suitable candidate material is a Shape Memory Alloy or SMA, an alloy which undergoes transformation from a high temperature phase, austenite, to a low temperature phase, martensite, over a selectable and specific temperature range. A suitable SMA may transform over a temperature range generally compatible with the operating temperature range of the battery. For example, the traction batteries used to power electric or hybrid vehicles are commonly maintained at a temperature lying between about 20° C. and about 35° C.

More particularly the reinforcements are fabricated of shape memory alloy composition(s) which may exhibit pseudoelastic, sometimes called superelastic, behavior to reversibly undergo strains in substantial excess of the elastic strains exhibited by typical metals. SMAs typically exhibit such behavior, to a degree which depends on alloy composition, when deformed at a temperature just greater than the temperature corresponding to the onset of transformation from its high temperature austenite phase to its low temperature martensite phase. Suitably such reinforcements will comprise no more than about 20% by weight, or no more than about 12% by volume of the active, high capacity electrode material.

Originally observed in equiatomic or near-equiatomic substantially binary alloys of nickel and titanium, shape memory behavior has been noted in a number of alloy systems including copper-zinc-aluminum-nickel and copper-aluminum-nickel alloys among others. Relatively minor differences in composition are effective in modifying the transformation temperature so that pseudoelastic behavior may be induced over a range of preferred temperatures by selecting a suitable transformation temperature and alloying to induce such a transformation temperature. Thus the composition of the shape memory alloy may be chosen so that its transformation temperature for the onset of the austenite to martensite transformation is substantially equal to the battery operating temperature.

In an embodiment, a plurality of shape memory alloy (SMA) reinforcements which may be fibers or elongated structures generally up to about 1 micrometer in diameter or lateral extent may be a dispersed in a volatile fluid carrier (for example, xylene or dimethyl formamide) possibly incorporating a wetting agent and, optionally, a binder. The fluid carrier and its dispersed SMA may be dispensed and applied to the current collector, either as a drop, a number of droplets or as a spray mist, to the surface of a negative current collector. Provided the collector surface is wet by the drop(s) the carrier fluid and its associated reinforcing structures will spread and disperse to a generally uniform thickness. The negative electrode current collector, is commonly fabricated as a copper foil 10 micrometers or so thick.

When the carrier is evaporated a layer of reinforcements will remain on the current collector surface. The reinforcements are expected to be generally uniformly distributed but disorganized, with the elongated reinforcements being randomly oriented and stacked atop one another to form a tangled stack with many openings and interstices.

A suitable high capacity negative electrode material may be applied to the current collector and its associated SMA reinforcements in any suitable manner. Silicon may be deposited by a physical vapor deposition process, such as sputtering in a radio-frequency (RF) plasma, pulse laser ablation, or e-beam evaporation to substantially any desired thickness. It can also be deposited by chemical vapor deposition (CVD), atomic layer deposition (ALD), and chemical vapor infiltration (CVI), with or without plasma enhancement. Commonly a thickness of between 10 micrometer and 50 micrometers is suitable for a lithium-ion battery application.

Tin may be electrodeposited on copper, with its applied SMA reinforcements. Tin may also be applied by electroless plating or by a displacement deposition reaction promoted by complexing with a $CN^-$ ion. The current collector may also be dipped in molten tin (melting point about 232° C.) or small beads or pellets of tin, may be applied to the collector, suitably fluxed, and melted in situ in a vacuum or inert atmosphere. Since tin will wet a clean copper surface a generally uniform coating may be achieved.

The high capacity negative electrode material may be applied to any desired depth but not greater than the thickness of the reinforcement stack or the length of any individual reinforcement, so that the entire thickness of the electrode material has reinforcements embedded within it. Applying an electrode material thickness less than the thickness of the reinforcement stack may enable a more porous or creviced surface on the electrode to permit electrolyte access to a larger surface area. A thicker deposit, comparable to the depth of the reinforcement layer may reduce the active surface area but increase the capacity of the electrode for lithium absorption.

In another embodiment a paste of commingled high capacity electrode material particles and SMA reinforcements with a binder and suitable solvent may be applied to the surface of the current collector to a suitable thickness. After evaporation of the solvent, the resulting aggregate, may offer greater access to electrolyte while still retaining resistance to spalling and fracture of the high capacity electrode material because of the action of the embedded reinforcements in keying the particles together for mutual support.

Suitable reinforcements may be fabricated of SMA nanowires, fabricated, for example, in pores formed in etched anodized alumina films. A more preferred approach however is to deposit, for example by sputtering, or co-electrodeposition, a thin film of SMA on a substrate. After deposition the film may be annealed, if necessary, to develop the desired SMA characteristics. After applying a patterned photoresist film as is well known to those skilled in the art, the SMA film may be etched to form a plurality of reinforcements. By dissolving the substrate the individual reinforcements may be released.

The pattern may be chosen to form elongated or compact reinforcements or a combination of both. This approach may be employed to produce wire- or rod-like geometries but also enables incorporating features in the reinforcements which enable more extensive engagement of the reinforcement with the electrode material.

Other objects and advantages of the invention will be apparent from detailed descriptions of practices for forming the high capacity negative electrodes incorporating SMA reinforcements. Reference will be made to illustrative drawing figures which are described in the following section of this specification.

DESCRIPTION OF PREFERRED EMBODIMENTS

Figure 1:
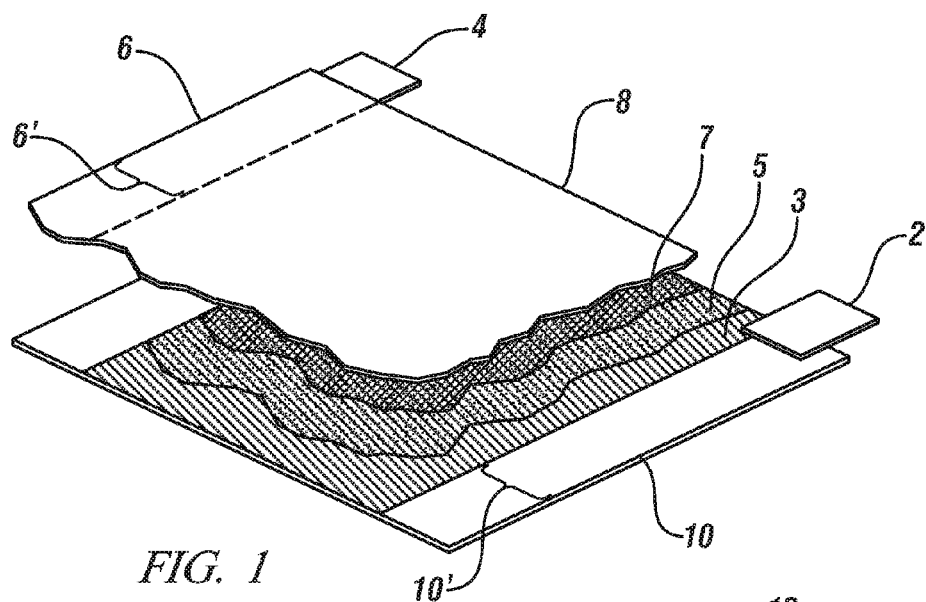
FIG. 1 is a cutaway perspective view illustrative of the structure of a single lithium ion cell.

Lithium ion batteries generally comprise a plurality of interconnected individual cells arranged so as to satisfy the voltage and electrical energy storage, or capacity requirements, of a particular application. An exemplary structure for such an individual cell is shown in cutaway perspective FIG. 1 and comprises facing negative 3 and positive 7 electrodes separated by an electrically non-conductive spacer 5. Each of the electrodes is coated on or attached to, an electrically conductive current collector commonly fabricated of copper (for the negative electrode 10) and aluminum (for the positive electrode 6). Conductive tabs 2, 4 may be attached to uncoated regions of the cell such as strips 10', 6' for tapping the electrical current generated by the cell. The configuration illustrated, which is exemplary and not limiting, is suitable for a cylindrical battery, for example an AA battery, in which the electrodes are rolled into a cylindrical shape and cell connections are made to the case and the cap of the battery casing. Internally electrical current is carried by flow of lithium ions through a lithium ion-conducting electrolyte dissolved in a non-aqueous solvent (not shown) which fills the gap between the electrodes. Spacer 5 is adapted to accommodate electrolyte so as to enable a continuous conductive path for lithium ions from one electrode to the other. In one common configuration, spacer 5 comprises a porous polymer layer with continuous pores from one surface to the other, enabling passage of lithium ions when the pores are infiltrated with electrolyte.

The direction of motion of the ions will depend on whether the cell is charging or discharging. On charging lithium ions will flow to the negative electrode where they will be reduced to lithium atoms and absorbed within the electrode material up to some limiting capacity. On discharge the electrode material will desorb lithium which will be oxidized to lithium ions and flow to the positive electrode.

Manufacturers and users of lithium ion batteries have interest in improving the durability and gravimetric and/or volumetric efficiency of such batteries. One opportunity for improved battery efficiency is to use a negative electrode material with a greater capacity for lithium ions than the graphite-based electrode in common use. Suitable high capacity electrode materials may include the metals silicon and tin which exhibit theoretical capacities of about 3600 mAh/g (for $Li_{15}Si_4$) and about 990 mAh/g (for $Li_{22}Sn_5$) respectively, either of which substantially exceeds the capacity of graphite (which forms $LiC_6$), with a capacity of about 372 mAh/g.

However the more closely-packed (than graphite), crystal structures of silicon and tin undergo significant volumetric expansion when lithium is introduced into their crystal lattice during a charging cycle. Because lithiation occurs progressively, the volume expansion is non-uniform throughout the electrode and so may generate significant stresses in the electrode. These stresses are capable of fracturing the electrode material, particularly bulk electrode material, causing some portion of the electrode material to fragment or spall off and so reducing the volume of the electrode participating in the cell electrochemical reaction. Further, the new electrode surface exposed by the fracture will react with, and deplete, the available lithium ions in the electrolyte. This behavior may re-occur on subsequent charge cycles to progressively reduce the cell and battery capacity and lead to battery fade.

These high capacity electrode materials may be viable candidate materials if they can incorporate an embedded reinforcement, or, more preferably, a plurality of generally uniformly distributed reinforcements, which are capable of sustaining some of the internally-generated loads resulting from these large volume changes. To be effective, the reinforcements should be capable of repeated recoverable extension and contraction without undergoing permanent shape change.

The large expansions undergone by the high capacity electrode materials, potentially as large as 300%, result in strain which exceed the elastic capabilities of most structural metals and alloys, which typically undergo irreversible plastic deformation at strains of only a few tenths of a percent. Any irreversibility of the applied strain would lead to the reinforcement acquiring a permanent 'set' which would resist the shrinkage of the electrode as it is being depleted in lithium. Thus the reinforcements are preferably fabricated of Shape Memory Alloys (SMAs) which, which, under suitable conditions may exhibit superelastic or pseudoelastic behavior giving rise to reversible strains of up to about 8%.

SMAs are alloys, variously based on nickel-titanium, copper-zinc-aluminum-nickel and copper-aluminum-nickel alloys among others, which, at higher temperatures, exhibit a first phase and crystal structure, generically called austenite. At a lower temperature the austenite phase may transform, through a shear transformation to a crystallographically different second phase known, for all SMA compositions, as martensite. The austenite to martensite transformation occurs over a relatively narrow temperature range beginning at a temperature designated as the martensite start or $M_s$ temperature and concluding at a lower, martensite finish, or $M_f$ temperature.

In many vehicle applications, the battery temperature is managed and controlled to maintain the battery temperature within a narrow temperature range, for example between about 20° C. and 35° C. Suitably the shape memory alloy may be selected so that its $M_s$ and $M_f$ temperatures are compatible with the battery operating range.

Because the transformation proceeds by shear, deformation at a temperature just above the $M_s$ temperature may initiate transformation and, with continued deformation, promote up to 100% transformation. Accompanying this stress-induced transformation, the SMA may exhibit up to 8% strain.

Reduction in the stress applied will reduce the extent of transformation and recover a portion of the strain. Removal of the load will lead to recovery of all strain. The strain recovery is substantially complete and may be repeated essentially indefinitely, making SMAs suitable for high capacity battery electrode reinforcements. Suitably such reinforcements may be elongated and up to about a micron in thickness or diameter. The length of the reinforcements should be no greater than the electrode thickness and will generally lie between 10 and 50 micrometers. The reinforcements may be generally cylindrical and smooth-surfaced, but preferably incorporate features to mechanically engage with the electrode for superior load transfer across the electrode-reinforcement interface.

A plurality of such SMA reinforcements may be generally uniformly distributed throughout the active electrode volume which will generally span a large portion of the current collector area. The thickness of the SMA reinforcement layer should be generally equal to the thickness of the electrode to ensure that the entire volume of the electrode is reinforced. But an excessively thick reinforcement layer is discouraged since any reinforcement extending above the electrode may penetrate the separator material and compromise its ability to prevent electrode to electrode contact and short-circuiting.

So, suitably the reinforcement layer may be up to about 50 micrometers thick. Preferably such elongated reinforcing structures are laid down in a random and irregular fashion so that the electrode may be reinforced in all three directions. Preferably the mass fraction of reinforcements will not exceed 20% and their volume fraction will not exceed 12%. The reinforcements may be applied by spraying or sprinkling a suitable number onto a dry current collector, but it is challenging to achieve even feeding of such fibers and to attain a generally uniform dispersion. A preferred approach may be to disperse a suitable quantity of reinforcements generally uniformly dispersed in a volatile carrier liquid. The carrier liquid may also contain possibly in conjunction with a small quantity of binder in solution, and, if the carrier liquid does not wet the current collector surface, include a wetting agent. For the commonly-used copper current collector suitable carriers include xylene, dimethyl formamide and dimethyl carbonate.

The fluid carrier and its dispersed SMA reinforcements may be applied, either as a drop, a number of droplets or as a spray mist, to the surface of a negative current collector where they will spread and disperse to a generally uniform thickness. It may be necessary to mask some portion of the current collector to contain the fluid within the electrode area. After evaporation of the carrier fluid a random distribution of reinforcements will remain on the current collector surface as generally shown in partial perspective view in FIG. 2 and in partial section at FIG. 3.

Figure 2:
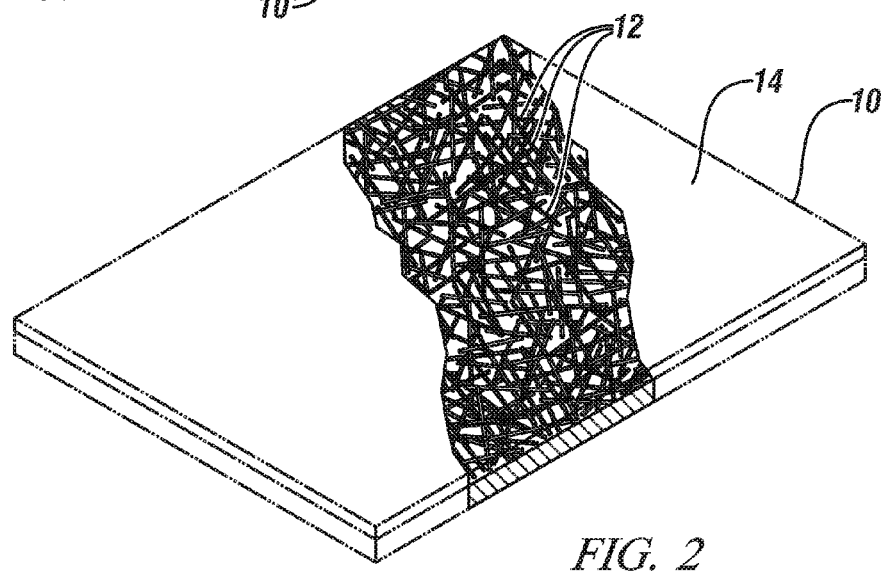
FIG. 2 is a perspective view of a random array of fiber reinforcements on a current collector.
Figure 3:
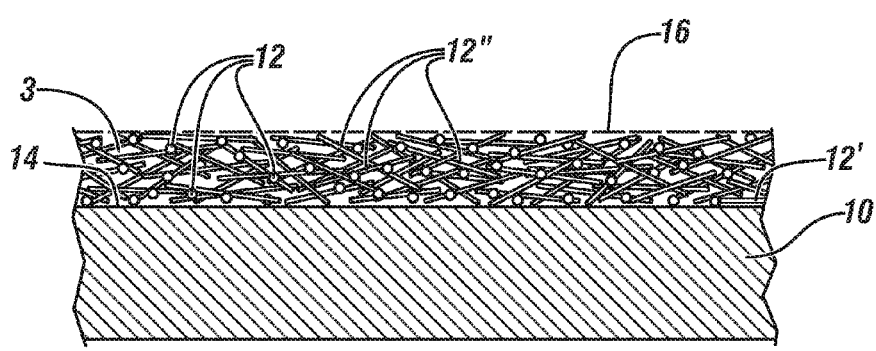
FIG. 3 is a cross-sectional view of the reinforcing fibers and current collector shown in FIG. 1 illustrating a fiber arrangement through the thickness of the (subsequently—applied) electrode layer. The fiber density shown is in excess of the preferred fiber density to better convey the range of fiber interactions which may result.

FIG. 2 shows a representative portion of collector 10 with surface 14 supporting a plurality of overlapping and randomly oriented reinforcements 12, here shown as generally straight-sided fibers. FIG. 3 shows a section through a portion of the collector and its overlying fibers. To demonstrate the range and extent of the random fiber interactions which may occur, the fiber density as depicted in FIG. 3 is greater than the preferred fiber density of less than about 12% by volume. Some fibers, like 12' may lie with their long surfaces abutting surface 14 and so provide vertical reinforcement over a depth only corresponding to their diameter. But some fibers like 12" may be inclined at an angle to the surface and so provide reinforcement throughout the extent of the intended depth of the electrode layer 3, indicated by dashed line 16. Recollect that the maximum fiber length should be no greater than the layer depth.

Electrode material may now be deposited on the current collector surface to engage and partially fill the crevices and interstices created by the random arrangement of overlying reinforcements and embed the reinforcements in the electrode material. The electrode deposit, although generally planar, will at least partially mimic the random arrangement of reinforcements with their crevices and interstices to create an irregular and roughened surface with extensive surface area. Suitable processes for depositing the electrode material as a generally monolithic layer include sputtering (primarily applicable to silicon); melting the electrode material and casting it on the current collector (primarily applicable to tin); electrodeposition, electroless deposition and/or by a displacement deposition reaction promoted by complexing with a $CN^-$ ion (all processes primarily suitable for tin).

A particulate electrode may also be employed. Such an electrode may be fabricated from a generally homogeneous paste of powdered electrode material particles incorporating reinforcements in a suitable carrier fluid possibly containing a low, between about 1% and about 2% by weight, concentration of a suitable binder material in solution. After applying a suitable thickness of the paste to the surface of the current carrier, for example by use of a doctor blade or comma coater or the like, the carrier fluid may be evaporated to leave the reinforced particulate electrode on the current collector.

Suitable reinforcing fibers may be grown by methods known to those skilled in the art. For example, on a suitable, electrically conducting substrate, deposit aluminum, for example, by sputtering, and anodize the aluminum to aluminum oxide. Then apply a photoresist mask and etch the exposed aluminum oxide, using for example a sulfuric acid solution to form pores. Deposit SMA in the pores, for example by co-deposition of Ni and Ti and, if required, a third element, then remove the aluminum oxide using a caustic solution and collect the fibers. The fibers may be annealed or otherwise thermally treated to develop or enhance their shape memory characteristics if necessary.

To be effective, loads must be efficiently transferred between the electrode material and the reinforcement. One approach to achieving such load transfer is to form a metallurgical bond between the electrode material and the reinforcement. However, some combinations of reinforcing fibers and electrode material may be incompatible so that no bond is formed. One example may be reinforcements based on near-equiatomic alloys of nickel and tin, commonly known as Nitinol, which exhibit an adherent oxide layer which interferes with forming a metallurgical bond.

The absence of a strong metallurgical bond may be overcome by application of a coating layer selected so that it bonds to both the reinforcement and the electrode material but it is often easier to remedy the absence of a metallurgical bond by promoting a mechanical interlock between reinforcement and electrode material. Typically fibers are of generally uniform or slowly varying cross-section and so offer little resistance to fiber pull-out but his may be rectified by changing the fiber cross-section. For example, some geometry may be imparted to the fiber by general etching of the fibers, particularly if the fibers were fabricated by elemental deposition which might lead to some compositional variation, and etch response variation, along their length. Selective masking of the fibers to suppress etching in the masked regions would also be effective in creating variable cross-sections and cross-sectional areas along the fiber but handling may be problematic.

As an alternative, the SMA may be deposited, for example by co-deposition during electroplating, on a suitably-shaped template which inherently exhibits features suitable for mechanical engagement. Reinforcements which are not elongated may be readily formed in this way. For example diatoms may serve as a template with complex compact geometry while small pore foams may serve as a suitable template for a bulk layer. If necessary the thickness of the coating layers may be adjusted by overall etching after deposition. Such an approach may be particularly beneficial for foams which may be difficult to form with suitably-small pore sizes.

Figure 4:
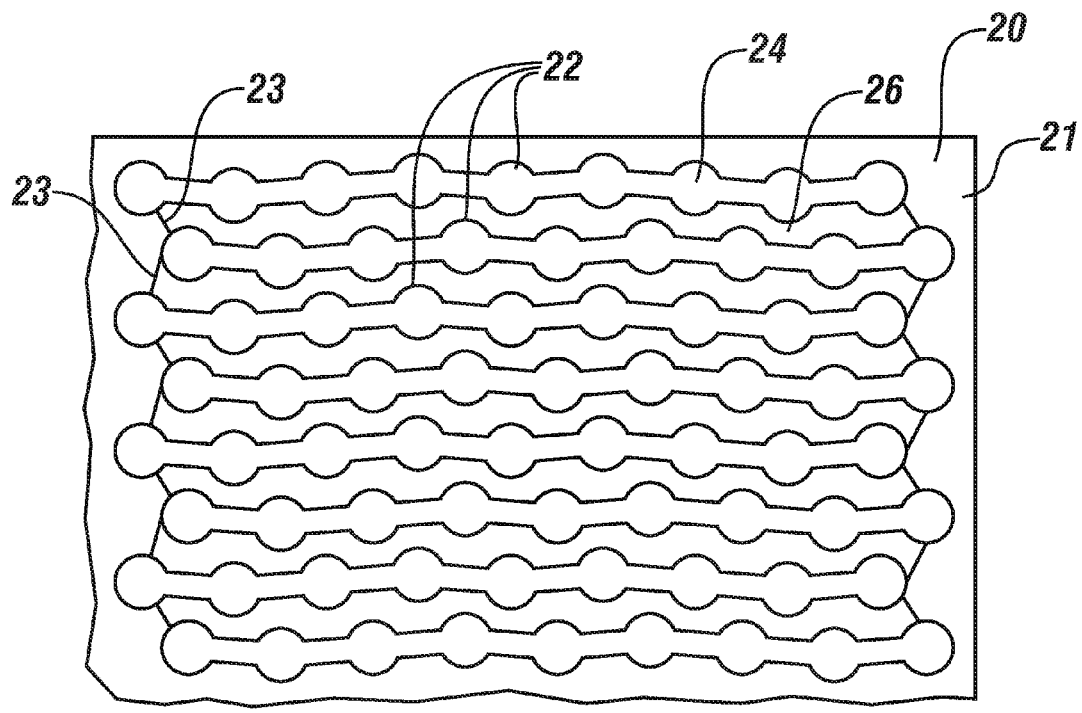
FIG. 4 shows, in fragmentary view, a much-enlarged, exemplary design for elongated reinforcements prepared by etching of an SMA thin film.
Figure 5:
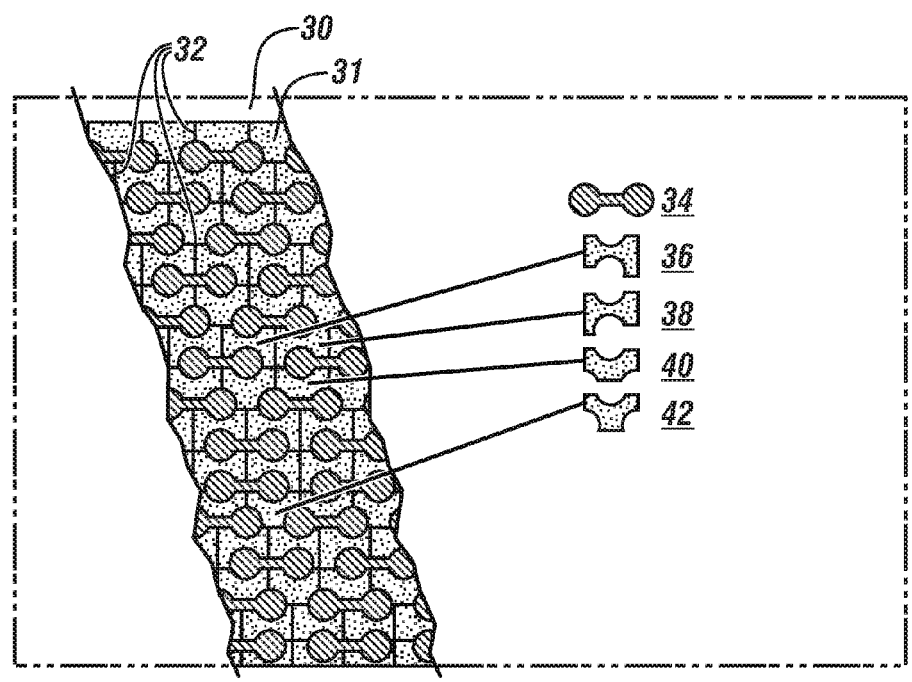
FIG. 5 shows, in fragmentary view, a second, much-enlarged, exemplary design for a variety of reinforcements prepared by etching of an SMA thin film.

A further approach to forming shaped elongated reinforcements is illustrated in FIGS. 4 and 5 and is based on masking and etching of planar SMA deposits laid down, by sputtering or other suitable means on a thermally-resistant soluble substrate, for example an alumina substrate. The thickness of the planar SMA layer should be maintained at about 1 micrometer or less so that the resulting reinforcement may not exceed about 1 micrometer in lateral dimension.

In an exemplary procedure, a surface of a relatively thick aluminum carrier may be anodized. The anodized surface layer may then serve as the desired alumina substrate for deposition or plating of a suitable SMA composition. Following deposition and annealing of the SMA film, if required, the film may be spin-coated with a thin film of photoresist. The photoresist may be exposed to UV light through a suitable mask to create a patterned photoresist layer such as the exemplary, but not limiting, pattern shown at FIG. 4.

If annealing of the SMA film is required and if the annealing temperature exceeds about 500° C. the use of an aluminum carrier, melting point about 660° C., may not be appropriate. In this case an alumina film may be sputtered onto a suitable high temperature-tolerant substrate and the deposited aluminum film be anodized.

FIG. 4 shows, in fragmentary view at high magnification, an SMA film 20, positioned on an anodized aluminum substrate (not shown) and overlain by a photoresist layer 21. Photoresist layer 21 has a pattern in which etch channels 22, 23 extend from the surface of the photoresist layer 21 to the surface of SMA layer 20. When exposed to a suitable etchant, for example diluted hydrofluoric acid (2 to 5%), the etchant may attack the SMA at an etching rate of about 1 micron/minute to create channels through the SMA. When these channels, extend from the surface of the film to the substrate they will leave a series of discrete elongated and complementary reinforcements 24, 26 attached to the anodized aluminum substrate. Dissolving the anodized layer, using, for example, caustic solution, will release all of reinforcements 24 and 26 for subsequent collection and placement on a current collector.

Of course, any suitable pattern may be used, and this and other examples shown should be considered exemplary, and not limiting. Also various embodiments may be derived from similar reinforcement patterns. As an example, the pattern shown in FIG. 4, may be modified to eliminate mask features giving rise to channels 23. This would produce only reinforcements shaped as reinforcement 24 while the remainder of the film would retain its sheet-like character and be discarded. In FIG. 5, a more complex patterning produces multiple and various etch channels 32 in photoresist layer 31 overlying SMA film 30. When the SMA is etched through and released, four distinguishable reinforcement geometries may result: dumbell 34; waisted features 36, 38 which are mirror-images of one another; and distinct, compact "C-shaped" features 40, 42.

These and any number of reinforcement geometries with recesses and projecting features will serve to engage with and reinforce the electrode material through mechanical interference in addition to any bonding between reinforcement and electrode material which may occur. The variation in cross-section along the length of the reinforcement need not be as large as shown in FIGS. 4 and 5 to create a suitable mechanical interference. For example a ratio of variation in cross-section, from least lateral extent to greatest lateral extent, of between about 1:1.1 and 1:1.5 will yield acceptable results.

The above descriptions of embodiments of the invention are intended to illustrate the invention and not intended to limit the claimed scope of the invention.

The invention claimed is:

1. A reinforced negative electrode for a lithium ion battery, the electrode comprising a current collector carrying, on a surface, a shaped deposit of reinforced electrode material of predetermined thickness, the reinforced shaped electrode material deposit consisting of a metallic, lithium-accepting composition incorporating a layer of randomly-oriented, electrically-conducting, superelastic shape memory alloy reinforcement fibers or elongated-structures arranged as a tangled stack, the fiber or elongated-structure reinforcement layer having crevices and interstices, the lithium-accepting composition being deposited as a monolithic body which engages the reinforcement fibers or elongated-structures and at least partially occupies the crevices and interstices in the current collector surface-carried reinforcement layer to embed the reinforcement fibers or elongated-structures in the lithium-accepting composition;

the superelastic shape memory alloy reinforcement fibers or elongated-structures being composed and adapted to reversibly deform in concert with the metallic lithium-accepting composition to limit loss of metallic lithium-accepting composition and assist in maintaining electrical connectivity throughout the electrode material volume as the electrode material expands and contracts during battery charging and discharging.

2. The reinforced negative electrode for a lithium ion battery recited in claim 1 in which the monolithic, metallic lithium-accepting composition comprises one of tin and silicon.

3. The reinforced negative electrode for a lithium ion battery recited in claim 1 in which the shape memory alloy reinforcements are metallurgically bonded to the lithium-accepting composition.

4. The reinforced negative electrode for a lithium ion battery recited in claim 1 in which the shape memory alloy reinforcement fibers and elongated-structures have shaped recesses and protrusions along their length for mechanically engaging the monolithic, metallic, lithium-accepting composition.

5. The reinforced negative electrode for a lithium ion battery recited in claim 1 in which the shape memory alloy reinforcement fibers or elongated-structures comprise nickel.

6. The reinforced negative electrode for a lithium ion battery recited in claim 1 in which the shape memory alloy reinforcement fibers or elongated-structures are present in an amount of about 20% by weight or less.

7. The reinforced negative electrode for a lithium ion battery recited in claim 1 in which the lithium-accepting composition has a thickness of between about 10 micrometers and 50 micrometers.

8. The reinforced negative electrode for a lithium ion battery recited in claim 1 in which the current collector comprises copper.

9. A lithium ion battery comprising a reinforced negative electrode, the electrode comprising a current collector carrying, on a surface, a shaped deposit of reinforced electrode material of predetermined thickness consisting of a monolithic, metallic, lithium-accepting composition incorporating a reinforcement layer of randomly-oriented, fiber or elongated-structure-shaped, electrically-conducting, superelastic shape memory alloy reinforcements arranged as a tangled stack, the reinforcement layer having crevices and interstices, the reinforcement layer being filled with the monolithic, metallic, lithium-accepting, composition which engages the reinforcements and at least partially occupies the crevices and interstices in the current collector surface-carried reinforcement layer to embed the reinforcements in the monolithic, metallic, lithium-accepting composition;

the reinforcements being adapted to reversibly deform in concert with the metallic, lithium-accepting composition to limit loss of monolithic, metallic, lithium-accepting composition and assist in maintaining electrical connectivity throughout the electrode volume as the electrode material expands and contracts during battery charging and discharging.

10. The lithium ion battery comprising a reinforced negative electrode recited in claim 9 in which the monolithic, metallic, lithium-accepting composition comprises one of tin and silicon.

11. The lithium ion battery comprising a reinforced negative electrode recited in claim 9 in which the shape memory alloy reinforcements have shaped recesses and protrusions along their length for mechanically engaging the monolithic, metallic, lithium-accepting composition.

12. The lithium ion battery comprising a reinforced negative electrode recited in claim 9 in which the shape memory alloy reinforcements comprise nickel.

13. The lithium ion battery comprising a reinforced negative electrode recited in claim 9, the lithium ion battery having an operating temperature range, and the shape memory alloy reinforcements having a composition which exhibits an austenite to martensite phase transformation start temperature suitable for enabling superelastic deformation of the shape memory alloy reinforcements over the lithium ion battery operating temperature range.

14. A lithium ion battery comprising a reinforced negative electrode, the electrode comprising a current collector carrying, on a surface, a shaped deposit of reinforced electrode material of predetermined thickness, the reinforced shaped electrode material deposit consisting of a monolithic, metallic, lithium-accepting composition incorporating a layer, of between 10 micrometer and 50 micrometers thick, of randomly-oriented, electrically-conducting, superelastic shape memory alloy reinforcement fibers or elongated-structures arranged as a tangled stack, the fiber or elongated-structure layer having crevices and interstices, the crevices and interstices of the layer being at least partially filled with a coextensive layer of the monolithic, metallic, lithium-accepting, composition which engages the reinforcement fibers or elongated-structures in the current collector surface-carried reinforcement layer to embed the reinforcements in the electrode material;

the reinforcement fibers or elongated-structures being adapted to reversibly deform in concert with the metallic lithium-accepting composition to limit loss of metallic lithium-accepting composition and assist in maintaining electrical connectivity throughout the electrode volume as the electrode material expands and contracts during battery charging and discharging.

15. The lithium ion battery comprising a reinforced negative electrode recited in claim 14 in which the monolithic, metallic lithium-accepting composition comprises one of tin and silicon.

16. The lithium ion battery comprising a reinforced negative electrode recited in claim 14 in which the shape memory alloy reinforcement fibers and elongated-structures have shaped recesses and protrusions along their length for mechanically engaging the monolithic, metallic, lithium-accepting composition.

17. The lithium ion battery comprising a reinforced negative electrode recited in claim 14 in which the shape memory alloy reinforcement fibers or elongated-structures comprise nickel.

18. The lithium ion battery comprising a reinforced negative electrode recited in claim 14, the lithium ion battery having an operating temperature range, and the shape memory alloy reinforcements having a composition which exhibits an austenite to martensite phase transformation start temperature suitable for enabling superelastic deformation of the shape memory alloy reinforcements over the lithium ion battery operating temperature range.

\* \* \* \* \*